United States Patent
Ikeda et al.

(10) Patent No.: US 10,791,340 B2
(45) Date of Patent: Sep. 29, 2020

(54) METHOD AND SYSTEM TO REFINE CODING OF P-PHASE DATA

(71) Applicant: SONY CORPORATION, Tokyo (JP)

(72) Inventors: Masaru Ikeda, Tokyo (JP); Ali Tabatabai, Cupertino, CA (US)

(73) Assignee: SONY CORPORATION, Tokyo (JP)

(*) Notice: Subject to any disclaimer, the term of this patent is extended or adjusted under 35 U.S.C. 154(b) by 460 days.

(21) Appl. No.: 15/351,558

(22) Filed: Nov. 15, 2016

(65) Prior Publication Data

US 2018/0139471 A1 May 17, 2018

(51) Int. Cl.

| | |
|---|---|
| *H04N 19/65* | (2014.01) |
| *H04N 19/176* | (2014.01) |
| *H04N 19/184* | (2014.01) |
| *H04N 19/167* | (2014.01) |
| *H04N 19/34* | (2014.01) |
| *H04N 19/17* | (2014.01) |
| *H04N 19/91* | (2014.01) |
| *H04N 19/593* | (2014.01) |
| *H04N 19/146* | (2014.01) |

(52) U.S. Cl.
CPC .......... *H04N 19/65* (2014.11); *H04N 19/167* (2014.11); *H04N 19/17* (2014.11); *H04N 19/176* (2014.11); *H04N 19/184* (2014.11); *H04N 19/34* (2014.11); *H04N 19/146* (2014.11); *H04N 19/593* (2014.11); *H04N 19/91* (2014.11)

(58) Field of Classification Search
CPC .... H04N 19/65; H04N 19/167; H04N 19/176; H04N 19/184; H04N 19/593; H04N 19/91; H04N 19/146; H04N 19/17; H04N 19/34

USPC .................................................... 375/240.08
See application file for complete search history.

(56) References Cited

U.S. PATENT DOCUMENTS

| | | | | |
|---|---|---|---|---|
| 7,881,384 | B2* | 2/2011 | Cote | H04N 19/176 375/240.13 |
| 9,129,409 | B2 | 9/2015 | Bauza et al. | |
| 9,143,797 | B2 | 9/2015 | He et al. | |
| 2008/0279299 | A1* | 11/2008 | Reuven | H04L 25/03318 375/267 |
| 2011/0026582 | A1* | 2/2011 | Bauza | G06T 3/4007 375/240.02 |

(Continued)

FOREIGN PATENT DOCUMENTS

| | | | | |
|---|---|---|---|---|
| EP | 2816805 A | 12/2014 | | |
| KR | 100270798 B1 * | 11/2000 | | H04N 19/61 |

(Continued)

*Primary Examiner* — Pinalben Patel
(74) *Attorney, Agent, or Firm* — Chip Law Group (57) ABSTRACT

A method and system to refine coding of P-phase data, includes receipt of an input P-phase data block. The P-phase data block may comprise a plurality of entropy coded bits and a plurality of un-coded bits of P-phase data values. A refinement step size is determined for the received input P-phase data block, based on a count of refinement bits available for coding of the plurality of un-coded bits and a block size of the input P-phase data block. A refinement start position is also determined for the received input P-phase data block. The plurality of un-coded bits of the P-phase data values are refined by allocation of the refinement bits in one or more bit-planes of the input P-phase data block, based on the determined refinement step size and the determined refinement start position.

22 Claims, 5 Drawing Sheets

(56) References Cited

U.S. PATENT DOCUMENTS

2014/0355675 A1* 12/2014 He ................. H04N 19/159
                                                  375/240.12

FOREIGN PATENT DOCUMENTS

KR          101566557 B1 * 11/2015 ........... H04N 19/105
WO        2002037859 A     5/2002

* cited by examiner

METHOD AND SYSTEM TO REFINE CODING OF P-PHASE DATA

CROSS-REFERENCE TO RELATED APPLICATIONS/INCORPORATION BY REFERENCE

None.

FIELD

Various embodiments of the disclosure relate to data compression. More specifically, various embodiments of the disclosure relate to a method and system to refine coding for P-phase data compression.

BACKGROUND

Image sensors are widely used in imaging devices, such as digital cameras, medical imaging equipment, thermal imaging devices, radar, sonar, and other electronic devices. Such imaging devices, which include image sensors, may be associated with digital Correlated Double Sampling (CDS) processing. The CDS processing may include a noise component and a true signal component. The noise component may be referred to as P-phase data. The true signal component may be referred to as D-phase data. The difference between the P-phase data and the D-phase data may be used to remove noise, such as an internal thermal noise (or kTC noise), associated with an image or a sequence of images to be captured by use of an image sensor of an imaging device. It may be desirable to refine the P-phase data for efficient compression of the image or the sequence of images captured by the image sensor.

In certain scenarios of refinement coding, such as in case of a uniform data pattern in an image or for P-phase data, refinement bits may be placed closer to each other in every coding block. Similar data pattern in every coding block may provide similar coding bits for a block encoding. A fixed refinement order may provide similar coded and un-coded bits in every coding block, which may not be desirable. As a consequence, coded bits and un-coded bits may provide a similar error pattern geometrically for an original and a decoded image.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and system are provided to refine coding of P-phase data substantially as shown in, and/or described in connection with, at least one of the figures, as set forth more completely in the claims.

These and other features and advantages of the present disclosure may be appreciated from a review of the following detailed description of the present disclosure, along with the accompanying figures, in which like reference numerals refer to like parts throughout.

DETAILED DESCRIPTION

The following described implementations may be found in the disclosed method and system to refine coding of P-phase data. Exemplary aspects of the disclosure may include a method to refine coding of P-phase data in an imaging device. The imaging device may include one or more circuits configured to receive an input P-phase data block, which may comprise a plurality of entropy coded bits and a plurality of un-coded bits of P-phase data values. The plurality of entropy coded bits may be coded by a differential pulse code modulation (DPCM) or pulse code modulation (PCM). The one or more circuits may be further configured to determine a refinement step size for the received input P-phase data block, based on a count of refinement bits available for coding of the plurality of un-coded bits and a block size of the input P-phase data block. In accordance with an embodiment, the determined refinement step size may correspond to a gap size to be maintained among the refinement bits available for coding of the plurality of un-coded bits in each of the one or more bit-planes. The gap size may be maintained for equal distribution of the refinement bits in each of the one or more bit-planes for the refinement. The one or more circuits may be further configured to determine a refinement start position for the received input P-phase data block, based on a number of sample groups of color values of the input P-phase data block and the block size of the input P-phase data block. In accordance with an embodiment, the determined refinement start position may correspond to a position from which the allocation of the refinement bits in the plurality of un-coded bits of the P-phase data values is to be initiated for the refinement. The one or more circuits may be configured to refine the plurality of un-coded bits of the P-phase data values by allocation of the refinement bits in one or more bit-planes of the input P-phase data block, based on the determined refinement step size and the determined refinement start position.

In accordance with an embodiment, the one or more circuits may be further configured to detect whether the count of the refinement bits available for coding of the plurality of un-coded bits is greater than or equal to a bit-plane size of a first bit-plane of the one or more bit-planes. Refinement of the first bit-plane of the plurality of un-coded bits may be executed by allocation of a number of the refinement bits equal to the bit-plane size in the first bit-plane in the event that the count of the refinement bits is greater than or equal to the bit-plane size of the first bit-pane. In accordance with an embodiment, the method may include refinement of the first bit-plane of the plurality of un-coded bits by a bit-by-bit allocation of the refinement bits in the first bit-plane in the event that the count of the refinement bits is less than the bit-plane size of the first bit-plane. The refinement bits may be allocated in the first bit-plane from the determined refinement start position, and the refinement bits may be equally spaced in the first bit-plane based on the determined refinement step size. The count of the refinement bits may be updated after each one-bit refinement or one-bit-plane refinement.

In accordance with an embodiment, the received input P-phase data block may be one of a plurality of P-phase data blocks received from an image sensor after entropy coding of the plurality of P-phase data blocks. A difference between P-phase data values and D-phase data values may be computed. The P-phase data values may correspond to the plurality of P-phase data blocks representative of a plurality of pixels in an image frame. The P-phase data values may correspond to digital pixel reset values that represent reference voltages of a plurality of pixels in the image frame. The D-phase data values may correspond to light-dependent digital pixel values that represent signal voltages of the plurality of pixels in the image frame.

In accordance with an embodiment, the method may include transformation of the image frame to a refined image frame, based on the computed difference between the P-phase data values and the D-phase data values. In accordance with an embodiment, the computed difference may be utilized to obtain the refined image frame by removal of noise from the image frame. In accordance with an embodiment, the image sensor may comprise a plurality of light-sensing elements, such that the computed difference may result in cancellation of the P-phase data values from corresponding D-phase data values for each of the plurality of light-sensing elements. This may be done to generate correlated double sampling (CDS) corrected digital output pixel values in the refined image frame.

Figure 1A:
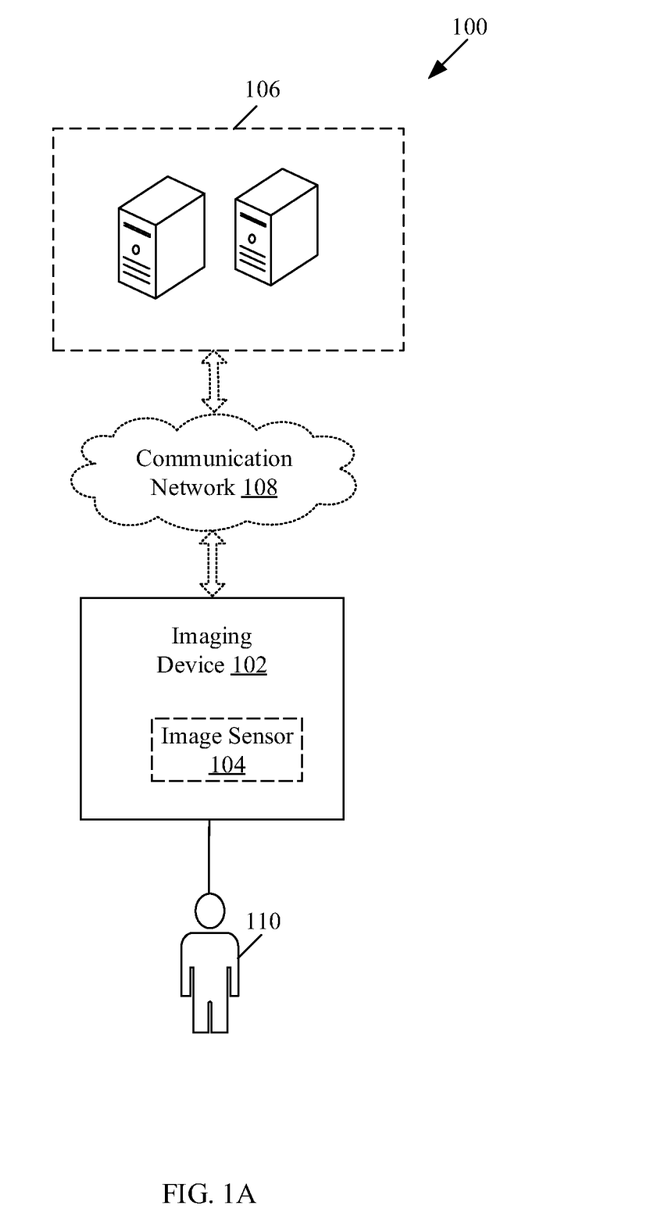
FIGS. 1A and 1B, collectively, depict a block diagram that illustrates a network environment to refine coding of P-phase data by an imaging device, in accordance with an embodiment of the disclosure.
Figure 1B:
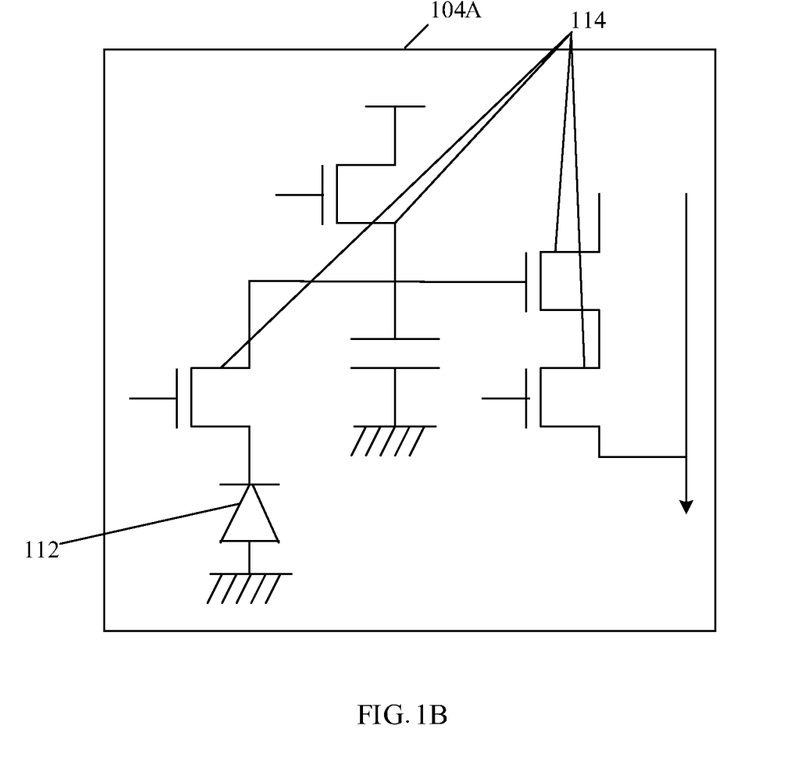

FIGS. 1A and 1B, collectively, depict a block diagram that illustrates a network environment to refine coding of P-phase data by an imaging device, in accordance with an embodiment of the disclosure. With reference to FIG. 1A, there is shown an exemplary network environment 100. The network environment 100 may include an imaging device 102, an image sensor 104, a server 106, a communication network 108, and one or more users, such as a user 110. The imaging device 102 may be communicatively coupled to the server 106, via the communication network 108. The user 110 may be associated with the imaging device 102.

The imaging device 102 may comprise suitable logic, circuitry, interfaces, and/or code that may be configured to communicate with the server 106. The imaging device 102 may include the image sensor 104. The imaging device 102 may be configured to refine coding of P-phase data. Examples of the imaging device 102 may include, but are not limited to, a camera, a camcorder, an image- and/or video-processing device, a motion-capture system, a smart phone, and/or a projector.

The image sensor 104 may comprise suitable logic, circuitry, interfaces, and/or code that may be configured to detect and convey information that constitutes an image or a sequence of image frames of a video. The image sensor 104 may convert the variable attenuation of light waves into signals or small bursts of current that convey the information. The sequence of image frames may be processed by the imaging device 102. This may be done for compression of the P-phase data values of a plurality of blocks representative of a plurality of pixels in a current image frame. Examples of the image sensor 104 may include, but are not limited to, semiconductor charge-coupled devices (CCD), complementary metal-oxide-semiconductor (CMOS) image sensors, digital pixel system (DPS) sensors, and/or digital sensors, such as flat-panel detectors.

The server 106 may comprise a suitable logic, circuitry, interfaces, and/or code that may be configured to communicate with the imaging device 102. The server 106 may further include one or more circuitries that may be configured for coding P-phase data. Examples of the server 106 may include, but are not limited to, a web server, a database server, a file server, an application server, or a combination thereof.

The communication network 108 may include a medium through which the imaging device 102 and the server 106, may communicate with each other. The communication network 108 may be a wired or wireless communication network. Examples of the communication network 108 may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), a Metropolitan Area Network (MAN), and/or the Internet. Various devices in the exemplary network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), Internet of Things (IOT) communication protocols, and/or other cellular communication protocols or Bluetooth (BT) communication protocols, including variants thereof.

In operation, the imaging device 102 may be configured to receive an input to capture an image or a sequence of image frames of a video. The sequence of image frames may comprise at least a previous image frame and a current image frame. The imaging device 102 may be further configured to receive a plurality of blocks of P-phase data values from the image sensor 104. The received plurality of blocks may represent a plurality of pixels in the current image frame of the captured sequence of image frames. The imaging device 102 that include the image sensor 104 may be associated with digital Correlated Double Sampling (CDS) processing. The CDS processing may include a noise component and a true signal component. The noise component may be referred to as P-phase data, such as the received plurality of blocks of P-phase data values. The received plurality of blocks of P-phase data values may correspond to digital pixel reset values that represent reference voltages of the plurality of pixels in an image frame. The true signal component may be referred to as D-phase data. The D-phase data values may also be concurrently received from the image sensor 104 at the time of the capture of the image frame or the sequence of image frames of the video. D-phase data values may correspond to light-dependent digital pixel values that represents signal voltages of the plurality of pixels in the image frame.

The difference between the received plurality of blocks of P-phase data values and the corresponding D-phase data values may be used to remove noise, such as the kTC noise, associated with the image or the sequence of image frames to be captured by the image sensor 104 of the imaging device 102. At the time of the capture of the image or the sequence of image frames, and in case of a rolling shutter type shutter mechanism of the imaging device 102, the received plurality of blocks of P-phase data values, may not be stored before the D-phase data values for the CDS. However, the CDS process, in case of a global shutter type of shutter mechanism of the imaging device 102, requires the noise component, such as the received plurality of blocks of P-phase data values, to be stored before the D-phase data values. In such a case, the P-phase data, such as the received plurality of blocks of P-phase data values, may need to be compressed to save memory or storage space of the imaging device 102. The global shutter may refer to a shutter mode that controls incoming light to all light-sensitive elements of the imaging device 102 simultaneously. Thus, in the imaging device 102 that use the global shutter, every pixel may be exposed simultaneously at the same instant in time.

The imaging device 102 may be configured to receive an input P-phase data block. The P-phase data block may comprise a plurality of entropy coded bits and a plurality of un-coded bits of P-phase data values. The plurality of entropy coded bits may be coded by DPCM or PCM. The imaging device 102 may be configured to determine a refinement step size for the received input P-phase data block, based on a count of refinement bits available for coding of the plurality of un-coded bits and a block size of the received input P-phase data block. The determined refinement step size may correspond to a gap size to be maintained among the refinement bits available for coding of the plurality of un-coded bits in each of the one or more bit-planes for equal distribution of the refinement bits in each of the one or more bit-planes for the refinement. The determination of the refinement step size is explained in detail, for example, in FIG. 2.

The imaging device 102 may further be configured to determine a refinement start position for the received input P-phase data block, based on a number of sample groups of color values of the received input P-phase data block and the block size of the received input P-phase data block. The determined refinement start position may correspond to a position from which the allocation of the refinement bits in the plurality of un-coded bits of the P-phase data values is to be initiated for the refinement. The determination of the refinement start position is explained in detail, for example, in FIG. 2. The imaging device 102 may further be configured to refine the plurality of un-coded bits of the P-phase data values by allocation of the refinement bits in one or more bit-planes of the received input P-phase data block. The plurality of un-coded bits of the P-phase data values may be refined based on the determined refinement step size and the determined refinement start position.

The imaging device 102 may be configured to detect whether the count of the refinement bits available for coding of the plurality of un-coded bits is greater than or equal to a bit-plane size of a first bit-plane of the one or more bit-planes. The first bit-plane of the plurality of un-coded bits may be refined by allocation of a number of the refinement bits equal to the bit-plane size in the first bit-plane. The refinement may be executed in the event that the count of the refinement bits is greater than or equal to the bit-plane size of the first bit-plane.

In accordance with an embodiment, the imaging device 102 may further include refinement of the first bit-plane of the plurality of un-coded bits by a bit-by-bit allocation of the refinement bits in the first bit-plane. The refinement may be executed in the event that the count of the refinement bits is less than the bit-plane size of the first bit-plane. The refinement bits may be allocated in the first bit plane from the determined refinement start position. The refinement bits may be equally spaced in the first bit-plane, based on the determined refinement step size. In accordance with an embodiment, the count of the refinement bits may be updated after each one-bit refinement or one-bit-plane refinement. In accordance with an embodiment, the input P-phase data block may be one of a plurality of P-phase data blocks received from the image sensor 104 after entropy coding of the plurality of P-phase data blocks.

With reference to FIG. 1B, there is shown a light-sensing element 104A, as a component of the image sensor 104. In accordance with an embodiment, the image sensor 104, included in the imaging device 102, may comprise a plurality of light-sensing elements, such as the light-sensing element 104A. The light-sensing element 104A may comprise a photodiode 114 and a plurality of transistors 116. The photodiode 114 may be configured to generate an output signal indicative of an intensity level of light impinging on the photodiode 114. The plurality of transistors 116 may be configured to control reset, charge transfer, and row-select operations of the plurality of light-sensing elements.

In accordance with an embodiment, the imaging device 102 may be configured to compute a difference between the P-phase data values and D-phase data values. The P-phase data values may correspond to the plurality of P-phase data blocks representative of a plurality of pixels in an image frame. The imaging device 102 may further be configured to transform the image frame to a refined image frame, based on the computed difference between the P-phase data values and the D-phase data values. In accordance with an embodiment, the computed difference may be utilized for removal of noise from the image frame to obtain the refined image frame.

The computed difference may result in cancellation of the P-phase data values from corresponding D-phase data values for each of the plurality of light-sensing elements. This may be done to generate correlated double sampling (CDS) corrected digital output pixel values in the refined image frame. In accordance with an embodiment, the P-phase data values received from the image sensor 104 may be processed prior to processing of the D-phase data values to enable storage of the received P-phase data values as the generated compressed P-phase data values in a memory unit (not shown) of the imaging device 102.

In accordance with an embodiment of the disclosure, the imaging device 102 may be configured to transmit the input P-phase data block to the server 106 via the communication network 108. The P-phase data block may comprise a plurality of entropy coded bits and a plurality of un-coded bits of P-phase data values. The server 106 may be configured to process the received input P-phase data block, received from the imaging device 102, to determine the refinement step size for the received input P-phase data block. This may be based on the count of refinement bits available for coding of the plurality of un-coded bits and the block size of the input P-phase data block. The server 106 may further be configured to determine the refinement start position for the received input P-phase data block, based on the number of sample groups of color values of the input P-phase data block and the block size of the input P-phase data block. From the determined refinement step size and the determined refinement start position, the server 106 may be configured to refine the plurality of un-coded bits of the P-phase values by allocation of the refinement bits in one or more bit-planes of the input P-phase data block. The server 106 may be further configured to transmit the refined plurality of un-coded bits to the imaging device 102, via the communication network 108.

Figure 2:
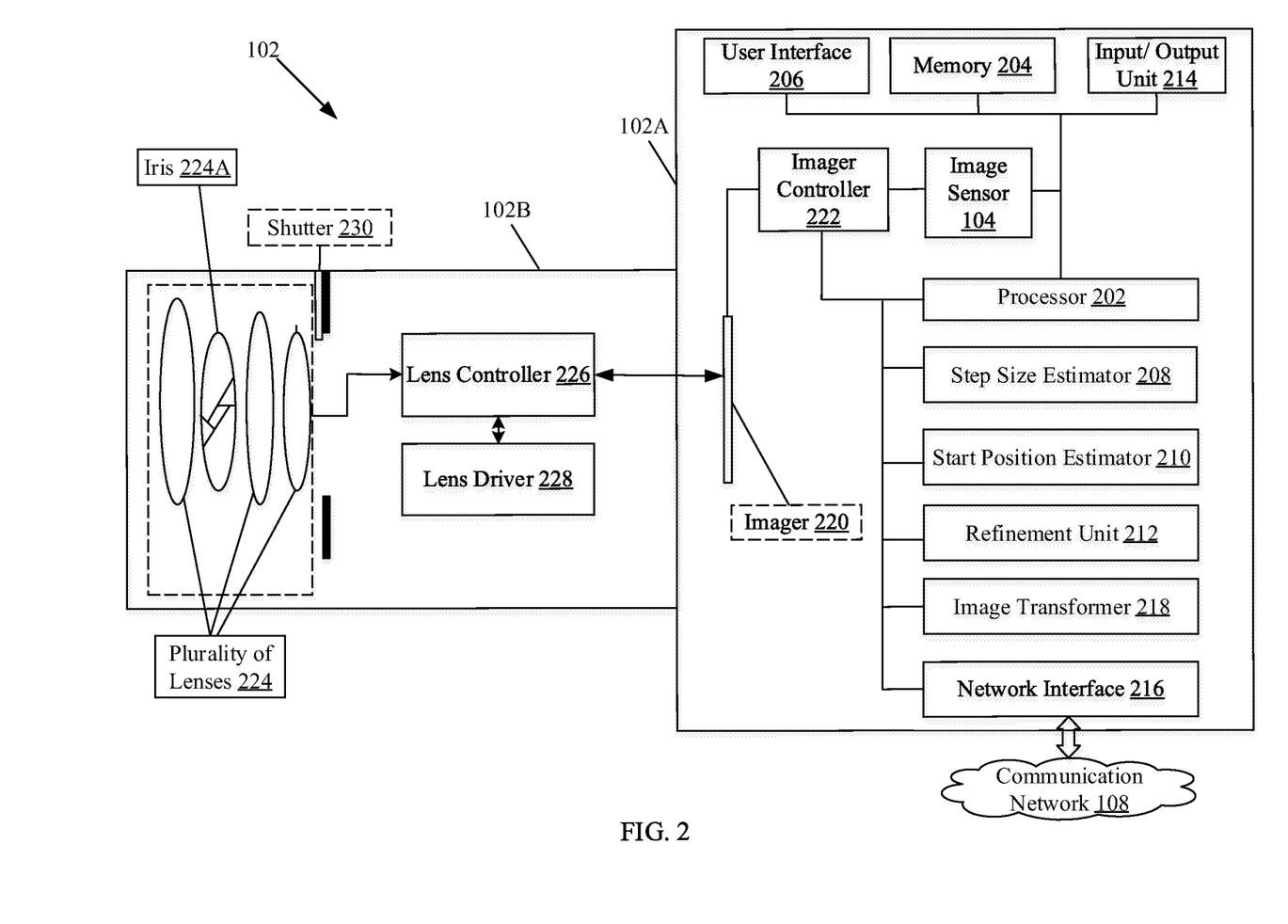
FIG. 2 is a block diagram of an imaging device to refine coding of P-phase data, in accordance with an embodiment of the disclosure.

FIG. 2 is a block diagram of an imaging device to refine coding of P-phase data, in accordance with an embodiment of the disclosure. FIG. 2 is explained in conjunction with elements from FIG. 1A and FIG. 1B. With reference to FIG. 2, there is shown there is shown the imaging device 102, which may include a processing circuitry section 102A and an incoming light control section 102B. The processing circuitry section 102A may include one or more circuits configured to refine coding of P-phase data. The one or more circuits may include a processor 202, a memory 204, a user interface (UI) 206, a step-size estimator 208, a start position estimator 210, a refinement unit 212, one or more input/output (I/O) units, such as an (I/O) unit 214, and a network interface 216. The communication network 108 (FIG. 1A) is shown associated with the network interface 216. The processing circuitry section 102A may further include an image transformer 218, an imager 220 controlled by an imager controller 222, and an image sensor, such as the image sensor 104. The incoming light control section 102B may include a plurality of lenses 224, controlled by a lens controller 226 and a lens driver 228. The plurality of lenses 224 may include an iris 224A. A shutter 230 is also shown in the incoming light control section 102B.

With reference to FIG. 2, the one or more circuits, such as the processor 202, the memory 204, the UI 206, the step-size estimator 208, the start position estimator 210, the refinement unit 212, the I/O unit 214, the network interface 216, and the image transformer 218, may be directly or indirectly coupled to each other. The output of the step-size estimator 208 and the start position estimator 210, may be provided to the refinement unit 212, in conjunction with the processor 202. Further, the output of the refinement unit 212 may be provided to the image transformer 218. The output of the image transformer 218 may be provided to the I/O unit 214. The network interface 216 may be configured to communicate with the exemplary server, such as the server 106, via the communication network 108.

In accordance with an embodiment, the imager 220 may be communicatively coupled to the image sensor, such as the image sensor 104. The plurality of lenses 224 may be in connection with the lens controller 226 and the lens driver 228. The plurality of lenses 224 may be controlled by the lens controller 226, in conjunction with the processor 202. In accordance with an embodiment, the processing circuitry section 102A of the imaging device 102 may be implemented in an exemplary server, such as the server 106, without deviation from the scope of the disclosure.

The processor 202 may comprise suitable logic, circuitry, interfaces, and/or code that may be configured to execute a set of instructions stored in the memory 204. The processor 202 may be further configured to refine coding of the P-phase data. The processor 202 may receive an input P-phase data block. The P-phase data block may comprise a plurality of entropy coded bits and a plurality of un-coded bits of P-phase data values. The received input P-phase data block may be one of a plurality of P-phase data blocks received from one or more sensing devices, such as the image sensor 104, after entropy coding of the plurality of P-phase data blocks. The processor 202 may be implemented based on a number of electronic control unit technologies known in the art. Examples of the processor 202 may be a Reduced Instruction Set Computing (RISC) processor, an Application-Specific Integrated Circuit (ASIC) processor, a Complex Instruction Set Computing (CISC) processor, and/or other processors.

The memory 204 may comprise suitable logic, circuitry, and/or interfaces that may be configured to store a machine code and/or a set of instructions with at least one code section executable by the processor 202. The memory 204 may store the received input P-phase data block. The memory 204 may be further configured to store one or more images and the video captured by the imaging device 102. The memory 204 may be further operable to store operating systems and associated applications of the imaging device 102. Examples of implementation of the memory 204 may include, but are not limited to, Random Access Memory (RAM), Read Only Memory (ROM), Hard Disk Drive (HDD), Flash memory, and/or a Secure Digital (SD) card.

The UI 206 may comprise suitable interfaces that may be rendered on the I/O unit 214 of the imaging device 102. The UI 206 may further be configured to present refined image frames generated by the imaging device 102.

The step-size estimator 208 may comprise suitable logic, circuitry, and/or interfaces that may be configured to determine a refinement step-size for the received input P-phase data block. The step-size estimator 208 may be implemented as a coprocessor or a special-purpose circuitry in the imaging device 102. The step-size estimator 208 and the processor 202 may be implemented as an integrated processor or as a cluster of processors that perform the functions of the step-size estimator 208 and the processor 202. The step-size estimator 208 may be implemented as a set of instructions stored in the memory 204, which upon execution by the processor 202, may perform the functions and operations of the imaging device 102.

The start position estimator 210 may comprise suitable logic, circuitry, and/or interfaces that may be configured to determine a refinement start position for the received input P-phase data block. The start position estimator 210 may be implemented as a separate processor or circuitry in the imaging device 102. The start position estimator 210 and the processor 202 may be implemented as an integrated processor or as a cluster of processors that perform the functions of the start position estimator 210 and the processor 202. The start position estimator 210 may be implemented as a set of instructions stored in the memory 204, which upon execution by the processor 202, may perform the functions and operations of the imaging device 102.

The refinement unit 212 may comprise suitable logic, circuitry, and/or interfaces that may be configured to refine the plurality of un-coded bits of the P-phase data values by allocation of the refinement bits in one or more bit-planes of the received input P-phase data block. The refinement unit 212 may be implemented as a separate processor or circuitry in the imaging device 102. The refinement unit 212 and the processor 202 may be implemented as an integrated processor or a cluster of processors that perform the functions of the refinement unit 212 and the processor 202. The refinement unit 212 may be implemented as a set of instructions stored in the memory 204, which upon execution by the processor 202, may perform the functions and operations of the imaging device 102.

The I/O unit 214 may comprise suitable logic, circuitry, interfaces, and/or code that may be configured to control presentation of the refined images and/or the refined plurality of un-coded bits on a display screen. The display screen may be realized through several known technologies, such as, but not limited to, Liquid Crystal Display (LCD) display, Light Emitting Diode (LED) display, and/or Organic LED (OLED) display technology. The I/O unit 214 may comprise various input and output devices that may be configured to communicate with the processor 202. Examples of the input devices or input mechanisms may include, but are not limited to, a shutter button, a record button on the imaging device 102 (such as a camera), a software button on the UI 206 of the imaging device 102, a touch screen, a microphone, a motion and/or gesture sensor, and/or a light sensor. Examples of the output devices may include, but are not limited to, the display screen, a projector screen, and/or a speaker.

The network interface 216 may comprise suitable logic, circuitry, interfaces, and/or code that may be configured to communicate with one or more cloud resources, such as the server 106 (as shown in FIG. 1A), via the communication network 108 (as shown in FIG. 1A). The network interface 216 may implement known technologies to support wired or wireless communication of the imaging device 102 with the communication network 108. Components of the network interface 216 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The image transformer 218 may comprise suitable logic, circuitry, and/or interfaces that may be configured to transform an image frame to a refined image frame by removal of noise from the image frame. The image transformer 218 may be implemented as a coprocessor or a special-purpose circuitry in the imaging device 102. The image transformer 218 and the processor 202 may be implemented as an integrated processor or a cluster of processors that perform the functions of the image transformer 218 and the processor 202. Alternatively, the image transformer 218 may be implemented as a set of instructions stored in the memory 204, which upon execution by the processor 202, may perform the functions and operations of the imaging device 102.

The imager 220 may comprise suitable circuitry and/or interfaces that may be configured to transform images from analog light signals into a series of digital pixels without any distortion. Examples of implementation of the imager 220 may include, but are not limited to, Charge-Coupled Device (CCD) imagers or Complementary Metal-Oxide-Semiconductor (CMOS) imagers, or a combination thereof.

The imager controller 222 may comprise suitable logic, circuitry, and/or interfaces that may be configured to control orientation or direction of the imager 220, based on the instructions received from the processor 202. The imager controller 222 may be implemented by utilizing various technologies that are well known to those skilled in the art.

The plurality of lenses 224 may correspond to an optical lens or assembly of lenses, used in conjunction with a camera body, such as the body of the imaging device 102, and mechanism to capture image frames. The image frames may be captured either on photographic film or other media that is capable to store an image chemically or electronically.

The lens controller 226 may comprise suitable logic, circuitry, and/or interfaces that may be configured to control various characteristics, such as zoom, focus, or aperture, of the plurality of lenses 224. The lens controller 226 may integrated as part of the imaging device 102, or may be a stand-alone unit, in conjunction with the processor 202. In case of the stand-alone unit, the lens controller 226 and/or the plurality of lenses 224, for example, may be implemented as a removable attachment to the imaging device 102. The lens controller 226 may be implemented by use of several technologies that are well known to those skilled in the art.

The lens driver 228 may comprise suitable logic, circuitry, and/or interfaces that may be configured to perform zoom and focus control and iris control, based on instructions received from the lens controller 226. The lens driver 228 may be implemented by use of several technologies that are well known to those skilled in the art.

The shutter 230 may allow light to pass for a determined or particular period, exposing the imager 220 to light in order to capture a plurality of image frames. The shutter may be of a global shutter type. The P-phase data, such as the plurality of blocks of P-phase data values, are received prior to the receipt of the D-phase data values in case of the global shutter type of shutter 230. Consequently, the CDS process in case of the global shutter type of shutter 230 requires the noise component, such as the received plurality of blocks of P-phase data values, to be stored before the D-phase data values.

In operation, the processor 202 may be configured to receive an input to capture an image or a sequence of image frames of a video. The sequence of image frames may be captured through the plurality of lenses 224 by use of the image sensor 104. The plurality of lenses 224 may be controlled by the lens controller 226 and the lens driver 228, in conjunction with the processor 202. The plurality of lenses 224 may be controlled based on an input signal received from the user 110. The input signal may be provided by the user 110, via selection of a graphical button rendered on the UI 206 or a button-press event of a hardware button available at the imaging device 102. Alternatively, the imaging device 102, may retrieve the image and/or the sequence of image frames pre-stored in the memory 204.

The processor 202 may be configured to receive the plurality of blocks of P-phase data values from the image sensor 104. The processor 202 may be configured to process an input P-phase data block. The p-phase data block may comprise a plurality of entropy coded bits and a plurality of un-coded bits of P-phase data values. The input P-phase data block may be one of a plurality of P-phase data blocks received from one or more sensing devices, such as the image sensor 104 (as described in FIG. 1A), after entropy coding of the plurality of P-phase data blocks. In accordance with an embodiment, the plurality of entropy coded bits may be coded by a DPCM or PCM. The memory 204, in conjunction with the processor 202, may store the received input P-phase data block.

The step-size estimator 208 may be configured to receive the input P-phase data block from the memory 204. The step-size estimator 208 may determine a refinement step size for the received input P-phase data block, based on a count of refinement bits available for coding of the plurality of un-coded bits and a block size of the received input P-phase data block. The determined refinement step size may correspond to a gap size to be maintained among the refinement bits available for coding of the plurality of un-coded bits in each of the one or more bit-planes for equal distribution of the refinement bits in each of the one or more bit-planes for the refinement. In accordance with an embodiment, the refinement step size for the received input P-phase data block may be determined based on the following equation (1):

$$S_{tepSize} = \frac{(int)B_{lockSize}}{(int)N_{RefBit}} \quad (1)$$

where,
$N_{RefBit}$ corresponds to the count of refinement bits available for coding of the plurality of un-coded bits;
$B_{lockSize}$ corresponds to block size of the received input P-phase data block; and
$S_{tepSize}$ corresponds to the determined refinement step size.

For example, the block size of the received input P-phase data block may be "16" and the count of the refinement bits available for coding of the plurality of un-coded bits may be "2". In such an instance, the refinement step size according to the equation (1) is determined to be "8". In another example, the count of the refinement bits available for coding of the plurality of un-coded bits may be 4. In such an instance, the refinement step size according to the equation (1) is determined to be 4.

The start position estimator 210 may be configured to receive the input P-phase data block from the memory 204. The start position estimator 210 may further be configured to determine a refinement start position for the received input P-phase data block based on a number of sample groups of color values of the received input P-phase data block and the block size of the received input P-phase data block. The determined refinement start position may correspond to a position from which the allocation of the refinement bits in the plurality of un-coded bits of the P-phase data values is to be initiated for the refinement. In accordance with an embodiment, the refinement start position for the received input P-phase data block may be determined based on the following equation (2):

$$X = Coef(B_{lockSize}, N_{SampleGroup}) * n \quad (2)$$

where,

"$n$" varies from 0 to $N_{SampleGroup} - 1$ $Coef(B_{lockSize}, N_{SampleGroup}) = 1; (B_{lockSize} =< N_{SampleGroup})$ $Coef(B_{lockSize}, N_{SampleGroup}) = \frac{(int)B_{lockSize}}{(int)N_{SampleGroup}}$ and $(B_{lockSize} > N_{SampleGroup}).$ $B_{lockSize}$ corresponds to block size of the received input P-phase data block;
$N_{SampleGroup}$ corresponds to number of sample groups of color values of the received input P-phase data block; and X corresponds to the determined refinement start position. For example, the number of sample groups of color values of the received input P-phase data block may be "8" and the block size of the received input P-phase data block may be "4". In such an instance, the refinement start position, according to the equation (2) is determined to be X=1*n (X=0, 1, 2, 3, 0, 1, 2, 3). In another example, the number of sample groups of color values of the received input P-phase data block may be "8" and the block size of the received input P-phase data block may be 16. In such an instance, the refinement start position, according to the equation (2), is determined to be X=2*n (X=0, 2, 4, 6, 8, 10, 12, 14).

The refinement unit 212 may be configured to receive the determined refinement step size and the determined refinement start position from the step-size estimator 208 and the start position estimator 210, respectively. The refinement unit 212 may further be configured to refine the plurality of un-coded bits of the P-phase data values by allocation of the refinement bits in one or more bit-planes of the received input P-phase data block, based on the refinement step size and the refinement start position as determined by the above described equations (1) and (2).

The processor 202 may be configured to detect whether the count of the refinement bits available for coding of the plurality of un-coded bits is greater than or equal to a bit-plane size of a first bit-plane of the one or more bit-planes. In accordance with an embodiment, the refinement unit 212 may further include refinement of the first bit-plane in the event that the count of the refinement bits is greater than or equal to the bit-plane size of the first bit-plane. Such a refinement of the first bit-plane may be referred to as a one-bit-plane refinement.

In accordance with an embodiment, the refinement unit 212 may further include refinement of the first bit-plane of the plurality of un-coded bits by a bit-by-bit allocation of the refinement bits in the first bit-plane. The bit-by-bit allocation of the refinement bits may be executed in the event that the count of the refinement bits is less than the bit-plane size of the first bit-plane. The refinement bits may be allocated in the first bit-plane from the determined refinement start position. The refinement bits may be equally spaced in the first bit-plane based on the determined refinement step size. Such a refinement of the first bit-plane may be referred to as a one-bit refinement. In accordance with an embodiment, the count of the refinement bits may be updated after each one-bit refinement or one-bit-plane refinement. In the event of one-bit refinement, the processor 202 may be configured to update the count of the refinement bits by reducing the count of the refinement bits by one bit. In the event of one-bit-plane refinement, the processor 202 may be configured to update the count of the refinement bits by reducing the count of the refinement bits by one-bit-plane.

In accordance with an embodiment, the processor 202 may compute a difference between P-phase data values and D-phase data values. The P-phase data values may correspond to the plurality of P-phase data blocks representative of a plurality of pixels in an image frame that may be captured by the imaging device 102. The P-phase data values may correspond to digital pixel reset values that represent reference voltages of a plurality of pixels in the image frame, and the D-phase data values corresponds to light dependent digital pixel values that represents signal voltages of the plurality of pixels in the image frame. The image transformer 218 may be configured to transform the image frame to a refined image frame, based on the computed difference between the P-phase data values and the D-phase data values. The computed difference may be utilized for removal of noise from the image frame to obtain the refined image frame. Alternatively stated, the computed difference may result in cancellation of the P-phase data values from corresponding D-phase data values for each of the plurality of light-sensing elements, such as the light-sensing element 104A. This may be done to generate CDS corrected digital output pixel values in the refined image frame.

The display screen included in the I/O unit 214, in conjunction with the image transformer 218 and the processor 202, may be configured to display or present the refined image frame on the display screen. In accordance with an embodiment, the processor 202 may be configured to store the refined image frame in the memory 204. The network interface 216 may be configured to transmit or communicate the refined image frame to one or more cloud resources, such as the server 106 (FIG. 1A), via the communication network 108 (FIG. 1A).

Figure 3:
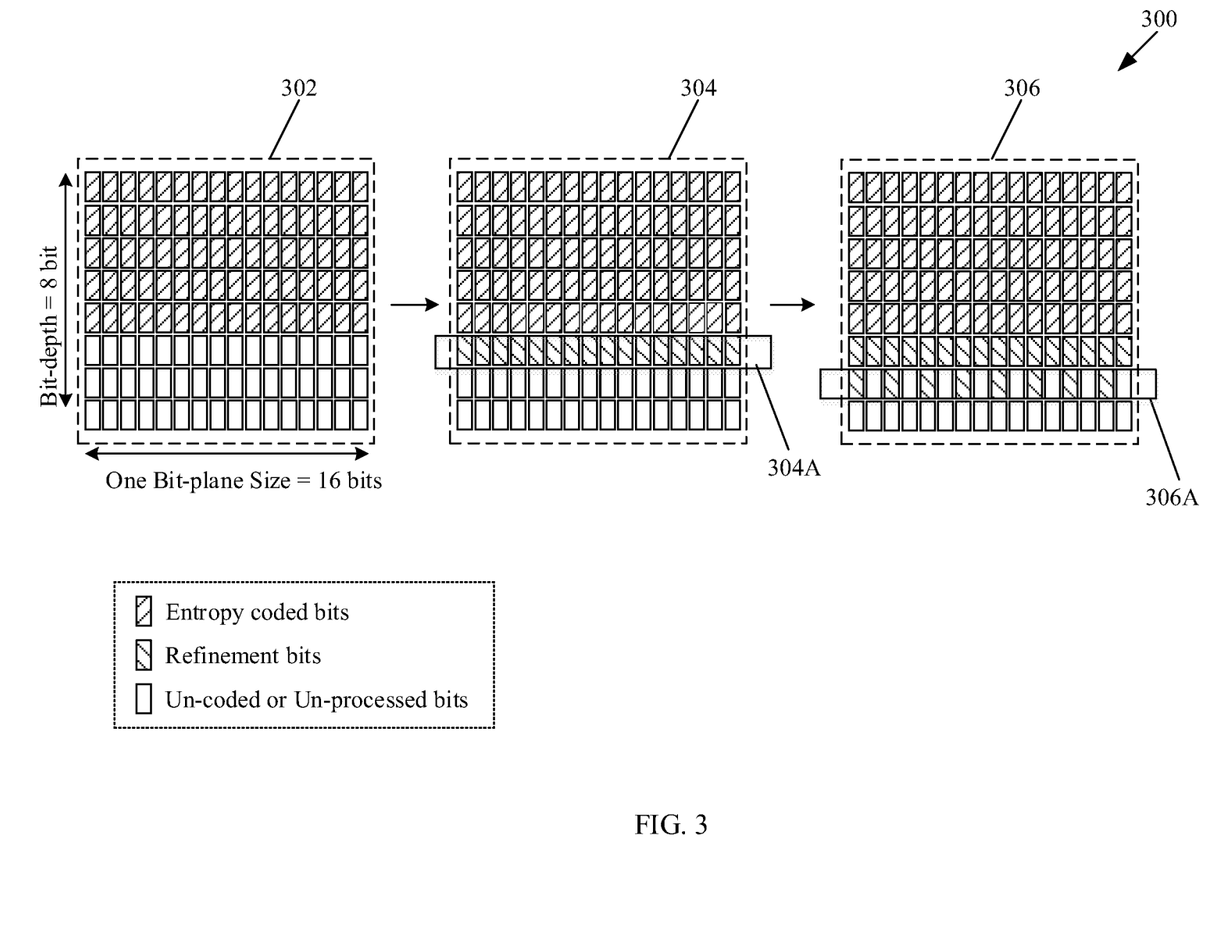
FIG. 3 illustrates an exemplary scenario to refine coding of P-phase data for P-phase data compression in an imaging device, in accordance with an embodiment of the disclosure.

FIG. 3 illustrates an exemplary scenario to refine coding of P-phase data for P-phase data compression in an imaging device, in accordance with an embodiment of the disclosure. FIG. 3 has been described in conjunction with elements from FIG. 1A, FIG. 1B, and FIG. 2. With reference to FIG. 3, there is shown an exemplary scenario 300 to refine coding of P-phase data in the imaging device 102. In the exemplary scenario 300, there is shown an input P-phase data block 302 with a block size of "16×1" and a bit-depth of "8" bits, a first bit-plane refinement output 304, and a second bit-plane refinement output 306. The block size of "16×1" represents "16" pixels with each pixel having the bit-depth of "8" bits.

With reference to the exemplary scenario 300, the input P-phase data block 302 may comprise a plurality of coded bits to a bit-depth of "5" (as shown) and plurality of un-coded bits to a bit-depth of "3" of P-phase data values. The bit-plane size of the input P-phase data block 302 is "16". The input P-phase data block 302 may be one of a plurality of P-phase data blocks received from one or more sensing devices, such as the image sensor 104 (FIG. 1A), after entropy coding of the plurality of P-phase data blocks.

In accordance with the exemplary scenario 300, "23" refinement bits, for example, may be available for coding of the plurality of un-coded bits in the input P-phase data block 302. The processor 202 may be configured to determine whether the count of the refinements bits (23) available for coding of the plurality of un-coded bits is greater than or equal to the bit-plane size (16) of one or more bit-planes of the input P-phase data block 302. In the event, the count of the refinements bits (23) available for coding of the plurality of un-coded bits is greater than or equal to the bit-plane size (16), the refinement unit 212 may be configured to refine one-bit-plane of the first bit-plane of the plurality of un-coded bits of the input P-phase data block 302. The result of the one-bit-plane refinement (indicated by operation 304A) of the first bit-plane of the plurality of un-coded bits in the input P-phase data block 302 is shown in the first bit-plane refinement output 304. The processor 202 may be further configured to update the number of refinement bits (23), based on the one-bit-plane refinement. In accordance with the exemplary scenario 300, the number of refinement bits (23) is reduced by one-bit-plane size (16). The updated number of refinement bits available for coding of a second plane of the one or more bit-planes of the input P-phase data block 302 is "23−16"="7" bits.

The processor 202 may then determine whether the updated number of refinement bits (7) is greater than or equal to the bit-plane size (16) of the second bit plane of the one or more bit-planes of the input P-phase data block 302. As the updated number of refinement bits (7) is less than the bit-plane size (16), the step-size estimator 208 may determine a refinement step size for the input P-phase data block 302 based on the equation (1), as described in FIG. 2. Further, the start position estimator 210 may be configured to determine a refinement start position for the input P-phase data block 302, based on the equation (2), as described in FIG. 2. The refinement unit 212 may then execute refinement of the second bit-plane of the plurality of un-coded bits by a bit-by-bit allocation (indicated by operation 306A) of the refinement bits (7) in the second bit-plane. The refinement bits (7) may be allocated in the second bit-plane from the refinement start position as determined by the start position estimator 210, and the refinement bits (7) may be equally spaced in the second bit-plane based on the refinement step size as determined by the step-size estimator 208. Such a refinement of the second bit-plane may be referred to as a one-bit refinement. In case of the one-bit refinement, the processor 202 may be configured to update the refinement bits (7) by reducing the refinement bits (7) by one bit. This process of one-bit refinement may continue until the processor 202 detects or determines that the total number of refinement bits available for coding of the plurality of un-coded bits is zero. The remaining plurality of un-coded bits that may not have been refined by the available number of refinement bits may correspond to the un-processed bits, as shown in the second bit-plane refinement output 306.

Figure 4:
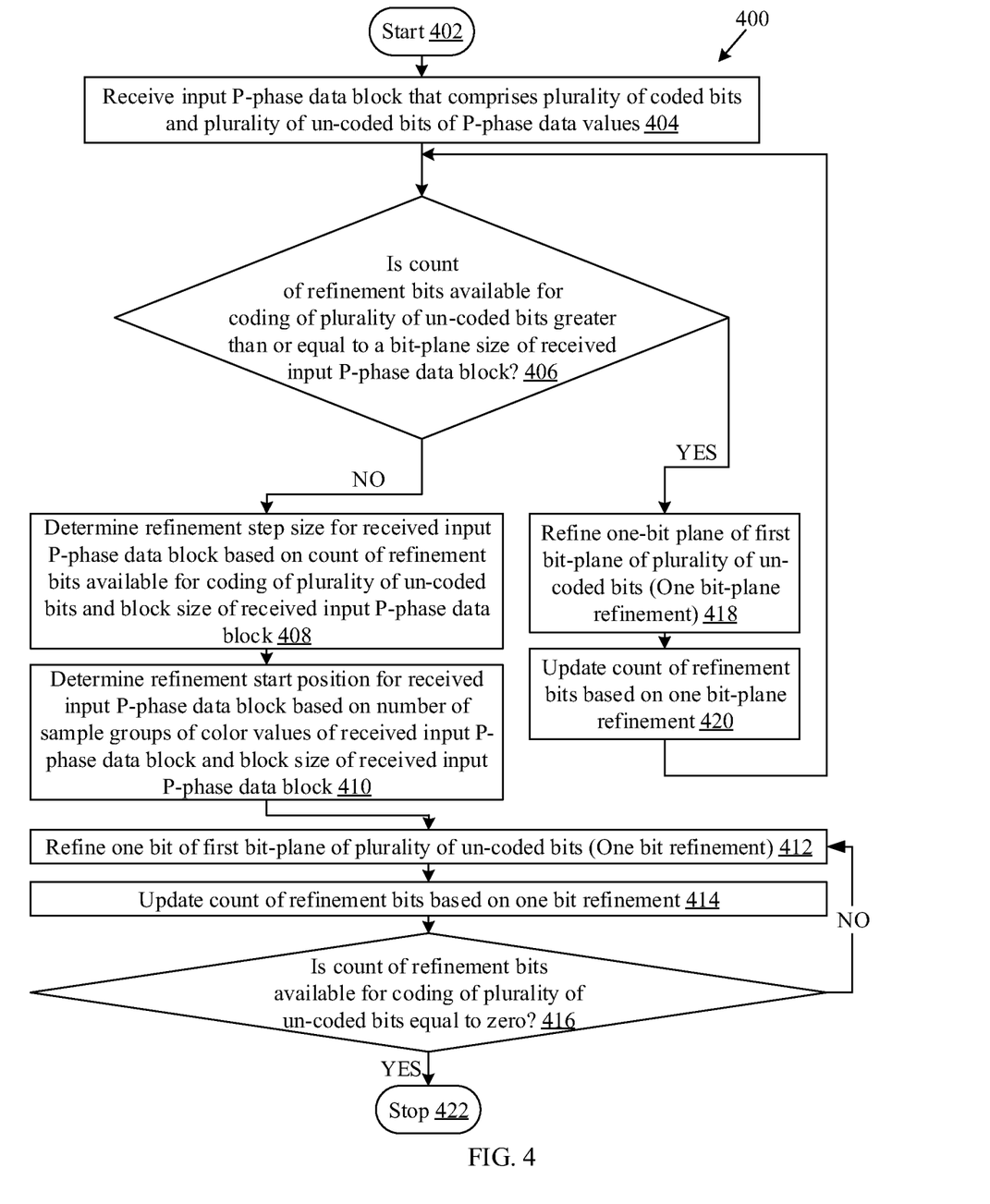
FIG. 4 depicts a flow chart that illustrates exemplary operations to refine coding of P-phase data in an imaging device, in accordance with an embodiment of the disclosure.

FIG. 4 depicts a flow chart that illustrates exemplary operations to refine coding of P-phase data in an imaging device, in accordance with an embodiment of the disclosure. With reference to FIG. 4, there is shown a flowchart 400. The flowchart 400 is described in conjunction with elements from FIG. 1A, FIG. 1B, FIG. 2, and FIG. 3. The method starts at 402 and proceeds to 404.

At 404, an input P-phase data block, which comprises a plurality of coded bits and a plurality of un-coded bits of P-phase data values, may be received. The processor 202 may be configured to receive the input P-phase data block. The received input P-phase data block may be one of a plurality of P-phase data blocks received from one or more sensing devices, such as the image sensor 104 (FIG. 1A), after entropy coding of the plurality of P-phase data blocks. An example of the received input P-phase data block 302 is shown and described, for example, in the FIG. 3.

At 406, it may be determined whether a count of refinement bits available for coding of the plurality of un-coded bits is greater than or equal to a bit-plane size of a first bit-plane of one or more bit-planes of the received input P-phase data block. The processor 202 may be configured to detect whether the count of the refinement bits available for coding of the plurality of un-coded bits is greater than or equal to the bit-plane size. In the event that the count of the refinement bits available for coding of the plurality of un-coded bits is greater than or equal to the bit-plane size of a first bit-plane of the one or more bit-planes of the received input P-phase data block, control passes to 418. In the event that the count of the refinement bits available for coding of the plurality of un-coded bits is less than the bit-plane size of a first bit-plane of the one or more bit-planes of the received input P-phase data block, control passes to 408.

At 408, in the event that the count of the refinement bits available for coding of the plurality of un-coded bits is less than the bit-plane size, a refinement step size for the received input P-phase data block may be determined. The refinement step size may be determined based on the count of refinement bits available for coding of the plurality of un-coded bits and a block size of the received input P-phase data block. The step-size estimator 208 may be configured to determine the refinement step size for the received input P-phase data block. The determined refinement step size may correspond to a gap size to be maintained among the refinement bits available for coding of the plurality of un-coded bits in each of the one or more bit-planes. This may be done to allow or facilitate equal distribution of the refinement bits in each of the one or more bit-planes for the refinement. The refinement step size for the received input P-phase data block may be determined based on the equation (1), as described in FIG. 2.

At 410, a refinement start position for the received input P-phase data block, based on a number of sample groups of color values of the received input P-phase data block and the block size of the received input P-phase data block, may be determined. The start position estimator 210 may be configured to determine the refinement start position for the received input P-phase data block, based on a number of sample groups of color values of the received input P-phase data block and the block size of the received input P-phase data block. The determined refinement start position may correspond to a position from which the allocation of the refinement bits in the plurality of un-coded bits of the P-phase data values is to be initiated for the refinement. The refinement start position for the received input P-phase data block may be determined based on the equation (2), as described in FIG. 2.

At 412, one bit of the first bit-plane of the plurality of un-coded bits may be refined. The refinement unit 212 may execute refinement of the first bit-plane of the plurality of un-coded bits by a bit-by-bit allocation of the refinement bits in the first bit-plane. This may be done in the event that the count of the refinement bits is less than the bit-plane size of the first bit-plane. The refinement bits may be allocated in the first bit-plane from the determined refinement start position, and the refinement bits may be equally spaced in the first bit-plane based on the determined refinement step size. Such a refinement of the first bit-plane may be referred to as a one-bit refinement, an example of which is shown in the second bit-plane refinement output 306 in the FIG. 3.

At 414, the count of the refinement bits may be updated based on the one-bit refinement. The count of the refinement bits may be updated after each one-bit refinement. In the event of one-bit refinement, the processor 202 may be configured to update the count of the refinement bits by reducing the count of the refinement bits by one bit.

At 416, it may be determined whether the count of refinement bits available for coding of the plurality of un-coded bits is equal to zero. The processor 202 may be configured to detect whether the count of refinement bits available for coding of the plurality of un-coded bits is equal to zero. In the event that the count of refinement bits available for coding of the plurality of un-coded bits is equal to zero, control passes to end 422. In the event that the count of refinement bits available for coding of the plurality of un-coded bits is not equal to zero, control passes back to 412.

At 418, in the event that the count of the refinement bits available for coding of the plurality of un-coded bits is greater than the bit-plane size of a first bit-plane of the one or more bit-planes of the received input P-phase data block, one-bit-plane of the first bit-plane of the plurality of un-coded bits may be refined. The refinement unit 212 may be configured to refine one-bit-plane of the first bit-plane in the event that the count of the refinement bits is greater than or equal to the bit-plane size of the first bit-plane. Such a refinement of the first bit-plane may be referred to as a one-bit-plane refinement an example of which is shown in the first bit-plane refinement output 304 in the FIG. 3.

At 420, the count of the refinement bits may be updated based on one-bit-plane refinement. In accordance with an embodiment, the count of the refinement bits may be updated after each one-bit-plane refinement. In the event of one-bit-plane refinement, the processor 202 may be configured to update the count of the refinement bits by reducing the count of the refinement bits by one-bit-plane size. Control passes back to 406.

In accordance with an embodiment of the disclosure, a system to refine coding of P-phase data is disclosed. The imaging device 102 (FIG. 1A) may comprise the one or more circuits, such as the processor 202 (FIG. 2), which may be configured to receive an input P-phase data block that comprises a plurality of entropy coded bits and a plurality of un-coded bits of P-phase data values. The imaging device 102 may comprise one or more circuits, such as the step-size estimator 208 (FIG. 2), which may be configured to determine a refinement step size for the received input P-phase data block, based on a count of refinement bits available for coding of the plurality of un-coded bits and a block size of the received input P-phase data block. The one or more circuits, such as the start position estimator 210 (FIG. 2), may be configured to determine a refinement start position for the received input P-phase data block, based on a number of sample groups of color values of the received input P-phase data block and the block size of the received input P-phase data block. The one or more circuits, such as the refinement unit 212 (FIG. 2), may be configured to refine the plurality of un-coded bits of the P-phase data values by allocation of the refinement bits in one or more bit-planes of the received input P-phase data block, based on the determined refinement step size and the determined refinement start position. A compressed bit stream of the P-phase data values is generated after the refinement of the plurality of un-coded bits of the P-phase data values.

The compressed P-phase data values that correspond to the received plurality of blocks of P-phase data values, may be stored in the memory 204 before the D-phase data is actually received from an image sensor, such as the image sensor 104, for the CDS process. The compressed P-phase data values may be stored prior to the receipt of the D-phase data in case of usage of the global shutter by imaging device 102 for capture of the image or the sequence of images. The compression of the P-phase data values saves storage space of the imaging device 102. Alternatively stated, with the same hardware or storage space, more image or video data may be captured and stored in the imaging device 102 as a result of the compression of the P-phase data values. Further, the processor 202 in conjunction with the refinement unit 212 ensures that the kTC noise for the image sensor 104 remains constant while there is a reduction of the additional noise incurred due to P-phase data compression. Further, conventional compression methods for low-complexity compression may include DPCM. DPCM may be effective for image compression, after an image is captured and where the captured image has adjacent pixel intensity values that are highly similar to each other. Unlike the conventional DPCM based compression method, where difference between two consecutive values of a block may be computed for compression purpose, the operations performed by the step-size estimator 208, the start position estimator 210, and the refinement unit 212, as described, is advantageous for data that exhibit noise-like characteristics, such as the P-phase data values. For data that exhibit noise-like characteristics, such as the P-phase data, the DPCM based compression method may not be effective for compression as adjacent P-phase data values may not exhibit high similarity or uniformity. Further, in addition to efficient compression of the P-phase data associated with the captured image or the sequence of image frames of the video, the disclosed method and the imaging device 102 for P-phase data compression also ensures removal of noise from the captured image, so as to generate a refined captured image with an improved picture quality. In contrast to traditional image compression methods, where an image or a sequence of image frames may be compressed after generation of an actual image or a sequence of image frames, the generation of the compressed P-phase data values that correspond to the received plurality of blocks of P-phase data values, occurs at the time of generation of an image or a sequence of image frames by use of the image sensor 104. Thus, an additional compression ability is provided to the imaging device 102 to save memory space both at the time of generation of the image or the sequence of image frames, and post generation of the image or the sequence of image frames.

The disclosed method to refine coding of P-phase data ensures equal refinement of the plurality of un-coded bits of the input P-phase data block unlike conventional refinement techniques. The P-phase data block may be one of a plurality of P-phase data blocks received from the image sensor 104. The P-phase data block may include various P-phase data values and may further represent a plurality of pixels in an image frame captured by any electronic device, such as the imaging device 102. As the refinement bits are equally spaced in a bit-plane based on the determined refinement step size, an improvement in the overall desirable structure of the error pattern is observed by the disclosed method to refine coding of P-phase data. The coded bits and un-coded bits of P-phase data values included in the processed P-phase data block may be accurately distinguished.

In accordance with an exemplary aspect of the disclosure, the imaging device 102 may be a camera. Thus, all the operations executed by the imaging device 102 as described in the present disclosure, may also be executed by the camera. Usually, the during capture of an image or a sequence of image frames of a video, raw data is captured which needs to be compressed to save memory space and memory access bandwidth. In view of the increased popularity of high definition image or video, such as ultra-definition video, image, 4K video, and other digital images or video, it is increasingly critical to develop advanced image compression techniques that may make possible high compression and still exemplify low hardware complexity. The disclosed method to refine coding of P-phase data ensures equal refinement of the plurality of un-coded bits of the input P-phase data block unlike conventional refinement techniques. An example of the operations executed by the camera may be understood, for example, from the flowchart 400 of FIG. 4. Similar to the camera, all the operations executed by the imaging device 102 as described in the present disclosure, such as in FIGS. 1A, 1B, 2, 3 and 4, may also be executed by a camcorder or a smart phone, for efficient compression to save memory space both at the time of generation of the image or the sequence of image frames, and also post generation of the image or the sequence of image frames, as described.

Various embodiments of the disclosure may provide a non-transitory computer readable medium and/or storage medium, wherein there is stored thereon, a machine code and/or a computer program with at least one code section executable by a machine and/or a computer for coding of P-phase data. The at least one code section in the imaging device 102 may cause the machine and/or computer to perform the steps that comprise reception of an input P-phase data block that comprises a plurality of entropy coded bits and a plurality of un-coded bits of P-phase data values. The imaging device 102 may be configured to determine a refinement step size for the received input P-phase data block based on a count of refinement bits available for coding of the plurality of un-coded bits and a block size of the received input P-phase data block. The imaging device 102 may be further configured to a refinement start position for the received input P-phase data block based on a number of sample groups of color values of the received input P-phase data block and the block size of the received input P-phase data block. The imaging device 102 may be further configured to refine the plurality of un-coded bits of the P-phase data values by allocation of the refinement bits in one or more bit-planes of the received input P-phase data block, based on the determined refinement step size and the determined refinement start position.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that falls within the scope of the appended claims.

What is claimed is:

1. A method for coding P-phase data, comprising:
   in an imaging device comprising circuitry:
   receiving, by said circuitry, an input P-phase data block, wherein
   said input P-phase data block comprises a plurality of entropy coded bits of P-phase data values and a plurality of un-coded bits of P-phase data values, and
   said P-phase data block is a noise component;
   determining, by said circuitry, a refinement step size for said received input P-phase data block based on a ratio of a count of refinement bits available for coding of all un-coded bits of said plurality of un-coded bits and a block size of said received input P-phase data block;
   determining, by said circuitry, a refinement start position for said received input P-phase data block based on a number of sample groups of color values of said received input P-phase data block and said block size of said received input P-phase data block; and
   refining, by said circuitry, said plurality of un-coded bits by allocating said refinement bits in at least one bit-plane of said received input P-phase data block, based on said determined refinement step size and said determined refinement start position.

2. The method according to claim 1, wherein
said determined refinement step size corresponds to a gap size between said refinement bits for said coding of said plurality of un-coded bits in each of said at least one bit-plane, for equal distribution of said refinement bits in each of said at least one bit-plane for said refinement.

3. The method according to claim 1, wherein said determined refinement start position corresponds to a position from which said allocation of said refinement bits in said plurality of un-coded bits of said P-phase data values initiates for said refinement.

4. The method according to claim 1, further comprising detecting, by said circuitry, whether said count of said refinement bits available for said coding of said plurality of un-coded bits is one of greater than or equal to a bit-plane size of a first bit-plane of said at least one bit-plane.

5. The method according to claim 4, further comprising refining, by said circuitry, said first bit-plane of said plurality of un-coded bits by allocation of a number of said refinement bits equal to said bit-plane size in said first bit-plane, based on said count of said refinement bits is one of greater than or equal to said bit-plane size of said first bit-plane.

6. The method according to claim 4, further comprising refining, by said circuitry, said first bit-plane of said plurality of un-coded bits by a bit-by-bit allocation of said refinement bits in said first bit-plane, based on said count of said refinement bits is less than said bit-plane size of said first bit-plane,
wherein
said refinement bits are allocated in said first bit-plane from said determined refinement start position, and
said refinement bits are equally spaced in said first bit-plane based on said determined refinement step size.

7. The method according to claim 1, wherein said count of said refinement bits is updated after each one-bit refinement or one-bit-plane refinement.

8. The method according to claim 1, wherein said input P-phase data block is one of a plurality of P-phase data blocks received from an image sensor after entropy coding of said plurality of P-phase data blocks.

9. The method according to claim 8, further comprising computing, by said circuitry, a difference between said P-phase data values and D-phase data values, wherein said P-phase data values correspond to said plurality of P-phase data blocks representative of a plurality of pixels in an image frame.

10. The method according to claim 9, wherein
said P-phase data values correspond to digital pixel reset values that represents reference voltages of said plurality of pixels in said image frame, and
said D-phase data values correspond to light dependent digital pixel values that represent signal voltages of said plurality of pixels in said image frame.

11. The method according to claim 9, further comprising transforming, by said circuitry, said image frame to a refined image frame based on said computed difference between said P-phase data values and said D-phase data values.

12. The method according to claim 9, wherein said computed difference is utilized for removal of noise from said image frame to obtain said refined image frame.

13. The method according to claim 9, wherein
said image sensor comprises a plurality of light sensing elements,
said computed difference corresponds to cancellation of said P-phase data values from corresponding D-phase data values for each of said plurality of light sensing elements, to generate correlated double sampling (CDS) corrected digital output pixel values in said refined image frame.

14. The method according to claim 1, wherein said plurality of entropy coded bits are coded by one of a differential pulse code modulation (DPCM) or a pulse code modulation (PCM) technique.

15. The method according to claim 1, wherein said number of sample groups of color values of said received input P-phase data block is 8 and said block size of said received input P-phase data block is 4.

16. The method according to claim 1, wherein said number of sample groups of color values of said received input P-phase data block is 8 and said block size of said received input P-phase data block is 16.

17. A system, comprising:
circuitry in an imaging device configured to:
receive an input P-phase data block, wherein
said input P-phase data block comprises a plurality of entropy coded bits of P-phase data values and a plurality of un-coded bits of P-phase data values, and
said P-phase data values is a noise component;
determine a refinement step size for said received input P-phase data block based on a ratio of a count of refinement bits available for a coding operation of all un-coded bits of said plurality of un-coded bits and a block size of said received input P-phase data block;
determine a refinement start position for said received input P-phase data block based on a number of sample groups of color values of said received input P-phase data block and said block size of said received input P-phase data block; and
refine said plurality of un-coded bits by allocation of said refinement bits in at least one bit-plane of said received input P-phase data block, based on said determined refinement step size and said determined refinement start position.

18. The system according to claim 17, wherein
said determined refinement step size corresponds to a gap size between said refinement bits for said coding operation of said plurality of un-coded bits in each of said at least one bit-plane, for equal distribution of said refinement bits in each of said at least one bit-plane for said refinement.

19. The system according to claim 17, wherein said determined refinement start position corresponds to a position from which said allocation of said refinement bits in said plurality of un-coded bits of said P-phase data values initiates for said refinement.

20. The system according to claim 17, wherein said circuitry is further configured to detect whether said count of said refinement bits available for said coding operation of said plurality of un-coded bits is one of greater than or equal to a bit-plane size of a first bit-plane of said at least one bit-plane.

21. The system according to claim 20, wherein said circuitry is further configured to refine said first bit-plane of said plurality of un-coded bits by allocation of a number of said refinement bits equal to said bit-plane size in said first bit-plane, based on said count of said refinement bits is one of greater than or equal to said bit-plane size of said first bit-plane.

22. The system according to claim 20, wherein said circuitry is further configured to:
refine said first bit-plane of said plurality of un-coded bits by a bit-by-bit allocation of said refinement bits in said first bit-plane based on said count of said refinement bits is less than said bit-plane size of said first bit-plane,
wherein
said refinement bits are allocated in said first bit-plane from said determined refinement start position, and said refinement bits are equally spaced in said first bit-plane based on said determined refinement step size.

\* \* \* \* \*